April 8, 1930.  G. C. PEARSON  1,753,249
TOOL RETAINER
Filed March 14, 1929   2 Sheets-Sheet 1

Inventor,
Gustav C. Pearson.
By
Attorney

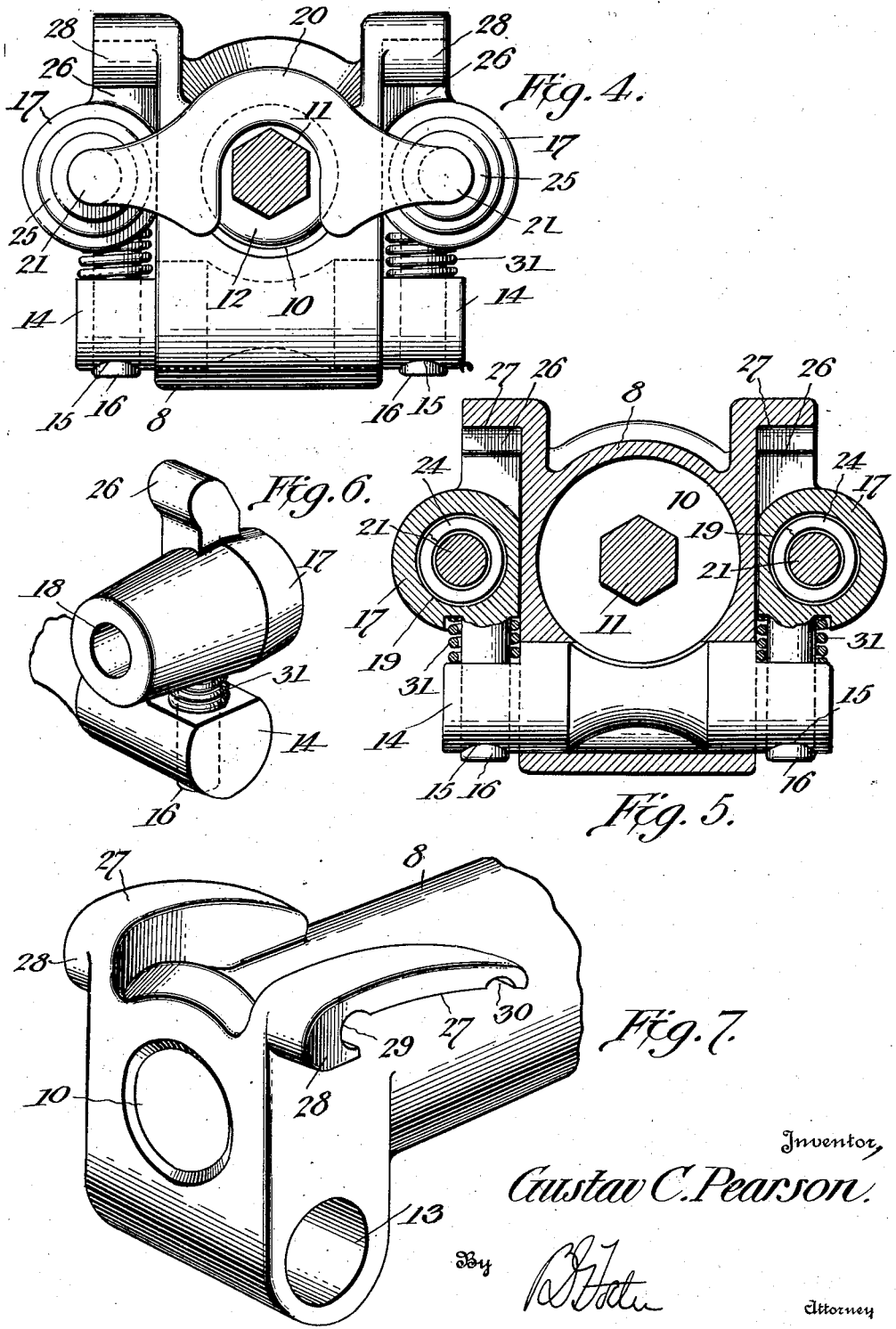

Patented Apr. 8, 1930

1,753,249

UNITED STATES PATENT OFFICE

GUSTAV C. PEARSON, OF DENVER, COLORADO, ASSIGNOR TO GARDNER-DENVER COMPANY, OF DENVER, COLORADO, A CORPORATION OF DELAWARE

TOOL RETAINER

Application filed March 14, 1929. Serial No. 347,126.

The object of the present invention is to provide a novel tool retainer and its mounting, in which the strain on the mounting is in substantial parallelism with the tool retained and in the same plane therewith, novel means being provided for holding the retainer in its operative and inoperative positions.

In the accompanying drawings:

Figure 4 is a front elevation.

Figure 5 is a sectional view on the line 5—5 of Figure 2.

Figure 6 is a detail perspective view of one of the carrier arms and its mounting.

Figure 7 is a detail perspective view of the tool holder housing.

Figures 1, 2, 3:
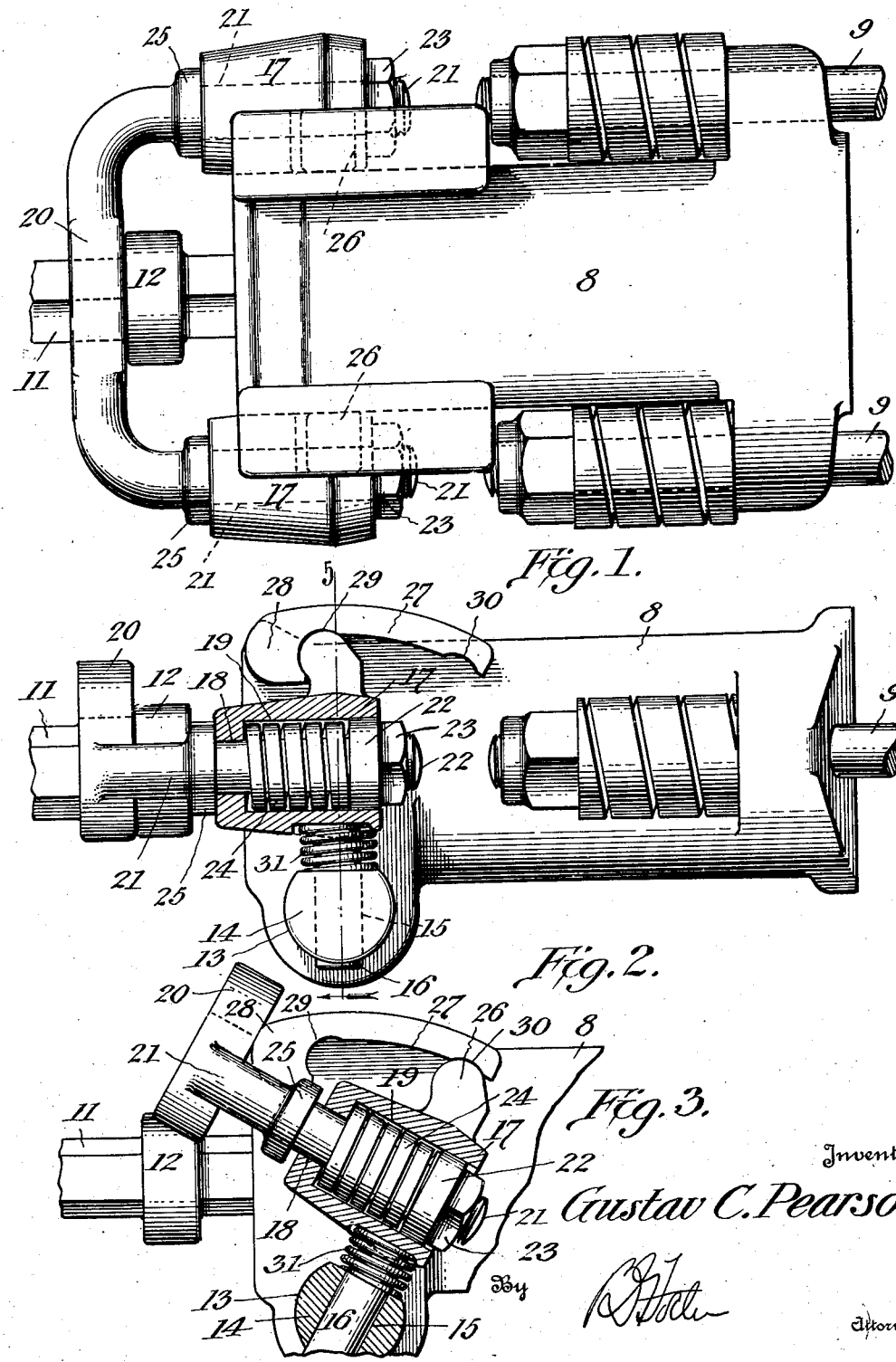
Figure 1 is a plan view of the preferred form of construction.
Figure 2 is a side elevation of the same with the parts shown in section.
Figure 3 is a detail view of a portion of the structure shown in Figure 2, but with the retainer in its inoperative position.

In the embodiment disclosed, a tool holder of well-known form is shown at 8, and as usual is secured to the body of the motor by side bolts 9. It is provided with the usual socket 10 for the reception of the shank 11 of a steel or other tool, said shank having a collar 12.

The holder is provided at one side of the socket 10 and at its front end with a transverse opening 13 in which is journaled a rock shaft 14 that projects beyond opposite sides of the holder 8 and has transverse openings 15 in its projecting ends. In said openings are slidably mounted the stems 16 of side carrier arms. These arms include transversely disposed heads 17 that are thus located longitudinally of the holder 8. The heads have openings 18 through their front ends extending into enlarged sockets 19 that open through the rear ends of said heads.

A tool retaining yoke 20 that is movable to and from a position where it embraces the shank 11 of the tool in advance of the collar 12, has rearwardly extending side arms 21 slidable in the openings 18 and extending through the sockets 19. On the rear ends of these arms are plungers 22 that are slidable in the sockets 19 and are held in place by nuts 23 threaded on the rear ends of the arms 21. Springs 24 are interposed between the plungers 22 and the front end walls of the sockets 19, these springs thus serving to hold the yoke rearwardly and yet permit its forward movement under strain. The rearward movement is limited by stop flanges 25 on the arms 21, and abutting the front ends of the heads 17.

The upper ends of the carrier arms terminate in knobs 26 that ride against the inner sides of curved trackways 27 formed on the tool holder 8. These trackways terminate at their front ends in inwardly turned stop abutments 28 forming front recessed seats 29 that receive the knobs 26. The rear end portions of the trackways have recessed seats 30 that are also adapted to receive the knobs as shown in Figure 3. In order to maintain the knobs in bearing engagement with the trackways and cause them to enter the seats 29 and 30, coiled springs 31 are located on the stems 16 of the arms and are interposed between the heads 17 and the ends of the rock shaft 14.

It is believed that the structure is thus made clear. When the yoke is swung to its active position, as shown in Figures 2 and 4, it embraces the shank 11 of the tool in advance of the collar 12 and thus prevents the detachment of the tool from the tool holder. When so positioned, the knobs 26 are in the sockets 29 and are yieldingly held therein by the springs 31 so that the yoke is locked in its active position. In this position it will be noted that the stems 21 are parallel to and in the plane of the steel so that any strain brought upon the yoke due to the collar striking the same, will be rectilinear and parallel to the steel and holder. In order to remove the tool, it is only necessary to swing the yoke to the position shown in Figure 3, whereupon it will clear the collar and permit the detachment of the steel. When this movement is accomplished the knobs 26 will ride out of the seats 29, the springs 31 yielding to permit this movement, and said knobs will ride along the trackways until they enter the seats 30, the springs 31 urging said knobs into the seats.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. The combination with a tool holder, of a swinging carrier, a pivotal mounting for the carrier, and on which it has a yielding mounting, a device with which the carrier yieldingly interfits to hold it in different positions, and a tool retainer movable with the carrier and having a yielding mounting thereon.

2. The combination with a tool holder, of a rock shaft journaled thereon, side arms slidably mounted in the rock shaft, a tool retaining yoke yieldingly mounted on the side arms, trackways slidably engaged by the side arms, and means for yieldingly holding the side arms against the trackways.

3. The combination with a tool holder, of a rock shaft journaled thereon, side arms slidably mounted in the rock shaft, a tool retaining yoke yieldingly mounted on the side arms, trackways slidably engaged by the side arms and having seats in which they are engaged to hold the yoke in its active and inactive positions, and means for yieldingly holding the side arms against the trackways.

4. The combination with a tool holder having a socket for detachably receiving a collared tool, of a rock shaft journaled transversely in the tool holder and having projecting ends provided with openings, carrier arms having stems slidable in the openings and also having transverse heads provided with sockets, a tool retaining yoke having side arms slidably and yieldingly mounted in the head sockets, trackways along which the end portions of the carrier arms ride, and means for urging the carrier arms against the trackways.

5. The combination with a tool holder having a socket for detachably receiving a collared tool, of a rock shaft journaled transversely in the tool holder and having projecting ends provided with openings, carrier arms having stems slidable in the openings and also having transverse heads provided with sockets, a tool retaining yoke having side arms slidably and yieldingly mounted in the head sockets, trackways along which the end portions of the carrier arms ride, said trackways having recessed seats to receive the arms, and springs on the carrier arms and interposed between the shaft and heads to urge the carrier arms against the trackways and into the seats.

In testimony whereof, I affix my signature.

GUSTAV C. PEARSON.